United States Patent
Kiefer et al.

(10) Patent No.: US 8,444,833 B2
(45) Date of Patent: May 21, 2013

(54) DEVICE FOR ELECTROCHEMICAL WATER PREPARATION

(75) Inventors: Randolf Kiefer, Gelsenkirchen (DE); Karl-Heinz Dulle, Olfen (DE); Peter Woltering, Neuenkirchen (DE); Stefan Oelmann, Hemer (DE); Ulf-Steffen Baeumer, Unna (DE); Wolfram Stolp, Hamm (DE)

(73) Assignee: Uhde GmbH, Dortmund (DE)

( * ) Notice: Subject to any disclaimer, the term of this patent is extended or adjusted under 35 U.S.C. 154(b) by 564 days.

(21) Appl. No.: 12/308,444

(22) PCT Filed: May 16, 2007

(86) PCT No.: PCT/EP2007/004345
§ 371 (c)(1),
(2), (4) Date: Aug. 3, 2010

(87) PCT Pub. No.: WO2007/144055
PCT Pub. Date: Dec. 21, 2007

(65) Prior Publication Data
US 2010/0294653 A1    Nov. 25, 2010

(30) Foreign Application Priority Data
Jun. 16, 2006 (EP) .......................... 10 2006 028 168

(51) Int. Cl.
*C02F 1/461* (2006.01)
*C25B 9/08* (2006.01)
*C25B 9/20* (2006.01)

(52) U.S. Cl.
USPC .......................................... 204/263; 204/257

(58) Field of Classification Search
None
See application file for complete search history.

(56) References Cited

U.S. PATENT DOCUMENTS

| 3,823,081 | A |   | 7/1974  | Trehame et al. |
|-----------|---|---|---------|---------------|
| 3,976,550 | A | * | 8/1976  | De Nora et al. ............... 205/511 |
| 4,056,458 | A | * | 11/1977 | Pohto et al. ................... 204/263 |
| 4,065,376 | A | * | 12/1977 | Whyte et al. .................. 204/263 |
| 4,069,129 | A | * | 1/1978  | Sato et al. ..................... 204/258 |
| 4,137,145 | A | * | 1/1979  | Wallace ........................ 204/279 |
| 4,149,952 | A | * | 4/1979  | Sato et al. ..................... 204/258 |
| 4,210,511 | A | * | 7/1980  | Campbell et al. ............. 204/256 |
| 4,233,146 | A | * | 11/1980 | Rothmayer et al. .......... 204/255 |

(Continued)

FOREIGN PATENT DOCUMENTS

| DE | 36 14 005 A1  | 10/1987 |
|----|---------------|---------|
| DE | 196 24 023 A1 | 12/1997 |

(Continued)

OTHER PUBLICATIONS

Machine translation of EP 1600426 from www.epo.org/searching/free/espacenet.html.*

Primary Examiner — Harry D Wilkins, III
(74) Attorney, Agent, or Firm — Marshall & Melhorn, LLC

(57) ABSTRACT

The invention relates to an electrolysis device for cleaning acidic waters which comprises a cathode, an anode, and an ion exchange membrane, wherein the membrane is arranged between the cathode and the anode and is attached at least along the entire circumference of its rim, wherein many inlets and outlets are arranged along the upper and lower rim of the electrolysis device which are linked to the cathode space or to the anode space, in such a way that a plug flow, ideally with a laminar profile, is created in the cathode space and in the anode space.

12 Claims, 2 Drawing Sheets

U.S. PATENT DOCUMENTS

| | | | | |
|---|---|---|---|---|
| 4,244,802 A | * | 1/1981 | Pohto et al. | 204/252 |
| 4,295,953 A | * | 10/1981 | Fuseya et al. | 204/257 |
| 4,346,150 A | * | 8/1982 | Bellows et al. | 429/453 |
| 4,411,749 A | * | 10/1983 | Sato et al. | 205/524 |
| 4,445,994 A | * | 5/1984 | Divisek et al. | 204/258 |
| 4,584,080 A | * | 4/1986 | Staab et al. | 204/255 |
| 4,588,483 A | * | 5/1986 | Woodard et al. | 205/513 |
| 4,639,303 A | * | 1/1987 | Staab et al. | 204/258 |
| 4,836,992 A | | 6/1989 | Rickert et al. | |
| 4,990,230 A | * | 2/1991 | Voss et al. | 204/633 |
| 5,082,549 A | * | 1/1992 | Voss et al. | 204/633 |
| 5,130,008 A | * | 7/1992 | Cabaraux et al. | 204/283 |
| 5,985,109 A | * | 11/1999 | Hara | 204/257 |
| 6,282,774 B1 | | 9/2001 | Borucinski et al. | |
| 6,464,845 B2 | | 10/2002 | Shirota et al. | |
| 7,309,408 B2 | | 12/2007 | Benavides | |

FOREIGN PATENT DOCUMENTS

| | | |
|---|---|---|
| DE | 196 41 125 A1 | 4/1998 |
| DE | 197 40 637 A1 | 4/1999 |
| DE | 20 2004 006 303 U1 | 11/2004 |
| EP | 1 600 426 A2 | 11/2005 |
| GB | 2 057 507 A | 4/1981 |

* cited by examiner

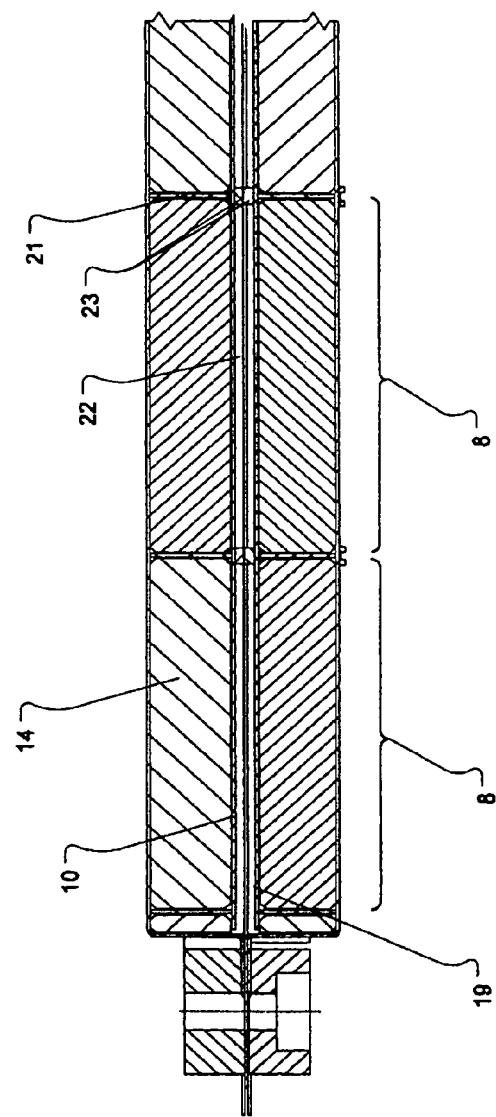
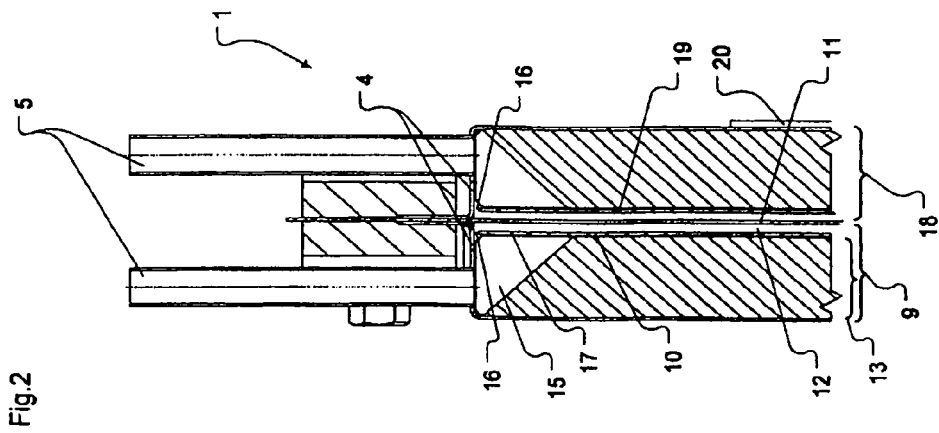
Fig.3
Fig.2

DEVICE FOR ELECTROCHEMICAL WATER PREPARATION

BACKGROUND OF THE INVENTION

The invention relates to an electrolysis device for the purification of acid waters, comprising a cathode, an anode and an ion exchange membrane, the membrane being arranged between the cathode and the anode and held at least continuously in the peripheral area, the upper and lower peripheral areas of the electrolysis device being provided with a large number of feed inlets and discharge outlets connected to the cathode and/or the anode compartment so that a plug flow forms in the cathode and in the anode compartment which, in an ideal version, is characterized by a laminar profile.

The clarification of sulphuric waters from residual open-cast mining sites is presently performed primarily by flooding with extraneous, if necessary, conditioned water owing to the large water volumes required. This process is, however, greatly restricted by the water supplies available, the effort expended for the transfer and the base capacity to be buffered. A clarification of residual open-cast mining sites by liming is, in most cases, inefficient owing to the high stoichiometric excess of basic substances.

DE 19624023 B1 discloses a process for the purification of acid waters in which the water purification process is carried out without admixing any additives to the water to be purified. In contrast to the standard neutralization, the purification effect is not achieved by adding alkaline solution to the water with high pH-value but by separating protons by the electrochemical separation in the cathodic partial reaction of the electrolysis process as shown in the below gross reaction equations:

$$4H^+ + 4e^- \rightarrow 2H_2 \quad (1)$$

$$4H_2O + 4e^- \rightarrow 2H_2 + 4OH^- \quad (2)$$

Analogously, the simultaneous electrochemical reduction of the oxygen dissolved in the water to hydroxide ions is generally of neutralizing effect.

$$2H_2O + O_2 + 4e^- \rightarrow 4OH^- \quad (3)$$

The reaction (3), however, contributes only little to the cathodic water purification. The use of an ion exchange membrane between the anode and the cathode compartment of the electrolysis cell additionally effects that for raising the pH-value—and for the hydrolysis and precipitation of aluminium and heavy metal ions involved—the salt content of the waters is also considerably reduced. To this end, the cathodic water purification process is coupled with an anodic synthesis process. If there are sulphate ions, the following reactions may take place on the anode side:

$$2H_2O \rightarrow 4H^+ + O_2 + 4e^- \quad (4)$$

$$2SO_4^{2-} \rightarrow S_2O_8^{2-} - 2e^- \quad (5)$$

In a reaction according to equation (4) the forming protons are saturated by the sulphate ions migrating into the anode compartment, where sulphuric acid is first formed and concentrated. In the second case, sulphate ions are oxidized to give peroxodisulphate and enriched in the anode compartment. In subsequent processes it is possible to recover these products. Similarly, it is also possible to utilize the hydrogen formed in the cathode reaction as a product.

GB 2057507 A or DE 36 14 005 A1 describe electrolysis devices which are generally suited for the before-mentioned processes. Electrolysis cells as known for industrial use in chlor-alkali electrolysis plants are described in DE 196 41 125, DE 197 40 637 or DE 19641 125. Among other components such cells are made up by a cathode and an anode compartment housing the cathode and the anode, resp. The ion exchange membrane is located between the electrodes, and the interior of each compartment is subdivided by the electrode into an electrode chamber and an electrode back chamber. The electrode chamber is bounded by the membrane and the electrode and the electrode back chamber by the electrode and the respective rear cell wall. Each cell has a feed inlet and a discharge outlet.

A disadvantage involved in these theoretically known processes and the known devices is that very high voltages must be applied to the known electrolysis devices in order to purify fluids the ion concentration of which is very low as compared to conventional electrolysis processes, as for example the chlor-alkali electrolysis, and their conductivity therefore very poor.

BRIEF SUMMARY OF THE INVENTION

The objective of the present invention, therefore, is to disclose a device which is suitable for fluids of low ion concentrations and characterized by low energy consumption in the specified operational mode.

The said objective is achieved in accordance with the invention by disclosing an electrolysis device for the purification of water comprising a cathode, an anode and an ion exchange membrane, the ion exchange membrane being arranged between the cathode and the anode, and held at least continuously in the peripheral area. The upper and the lower section of the peripheral areas of the electrolysis device are provided with a large number of feed inlets and discharge outlets to ensure the passage of fluid through the cathode and/or the anode compartment.

It was found that an extensively laminar flow profile with a relatively narrow retention time spectrum, which may be described by a plug flow, forms in the device according to the present invention. Operation of this device yielded excellent degradation results in line with a low electric power consumption. For generating a stable laminar flow at low power consumption, the maximum electrode distance from the ion exchange membrane is 5 mm and the minimum 1.5 mm.

An advantageous embodiment involves that the electrolysis device is designed as an assembly of individual cells. Such an individual cell essentially consists of two compartments, the outermost rim of the compartments being provided as circumferential flange, followed by a cell rim subsequent to a circumferential edge, which borders the rear wall of the cell. The electrodes are attached on the inside to the respective cell rear wall by means of webs and opposite the webs, i.e. on the electrode side facing the membrane, spacers are arranged for fixing the membrane and conducting the power. In such a way, the electrode as well as the anode and the cathode compartment are subdivided into several parallel sub-compartments.

In the specified operational mode a large number of such individual cells are suspended one after the other in plane-parallel position in a supporting structure and braced with each other, power passing through one after the other in vertical direction to the membrane and electrode surfaces.

In an advantageous manner, the feed inlets and discharge outlets are arranged behind the electrode when seen from the membrane and at least one feed inlet and one discharge outlet is assigned to each sub-compartment. A further improvement is that the space between the rear wall of the cell and the electrode, i.e. the electrode back chamber, is filled with inert material to more than 90% so that, in the specified operation mode, the water—except for slight peripheral flows—is routed into the space between the electrode and the membrane. In an ideal version, the electrode back chamber is packed completely.

To improve the flow configuration for the feed and discharge of fluids, the inert material in the area of the feed inlets and discharge outlets is shaped in such a way or is provided with an adequate aperture to allow that one or several channels is/are formed in parallel with the upper and lower cell wall. The fluid will then flow through the gap produced between the edge of the respective electrode and the rim of the cell. In an ideal version, this gap between the upper and the lower edge of the electrode and the rim of the cell is of a minimum width of 0.5 mm and a maximum width of 5 mm.

Since the volumetric flow in the cathode compartment is very high, the cathode is additionally provided with apertures, bores or the like at the upper and the lower edge. The water flowing into the cathode back chamber can thus be routed in a suitable manner into the cathode compartment without any need to increase the pressure in the feed line.

In an ideal version, the anode of the device according to the present invention is constructed of expanded metal mesh and the cathode as a plane metal sheet. The packing elements filling the electrode back chamber are advantageously bevelled along the vertical edges for dehydrating the electrode back chamber and avoiding corrosion.

The invention also relates to an electrolysis device for the purification of water, which is constructed as a filter press and consists of a large number of individual cells lined up one after the other. Each of these individual cells has an anode and a cathode compartment as well as a diaphragm or ion exchange membrane arranged in between. Each individual cell is separated from the neighbouring cell by bipolar cell walls. The anode and cathode compartments can be filled with mats which are permeable to fluids and elastic and serve to fix the ion exchange membrane.

An advantageous embodiment involves that spacers are arranged on the electrode side facing the membrane which serve to fix the membrane and conduct the power, by which the electrode and the space between the electrode and membrane are subdivided into several sub-compartments, each sub-compartment being provided with at least one feed inlet and one discharge outlet.

The device can be improved by designing the sealing material which is arranged above and below the space between membrane and electrode in such a way that the numerous feed inlets and discharge outlets run through this sealing material and, in an ideal version, can be fastened to it by means of bolts.

BRIEF DESCRIPTION OF THE DRAWINGS

FIG. 2 shows a section view along line A of FIG. 1.
FIG. 3 shows a section view along line B of FIG. 1.

DETAILED DESCRIPTION OF THE INVENTION

Figure 1:
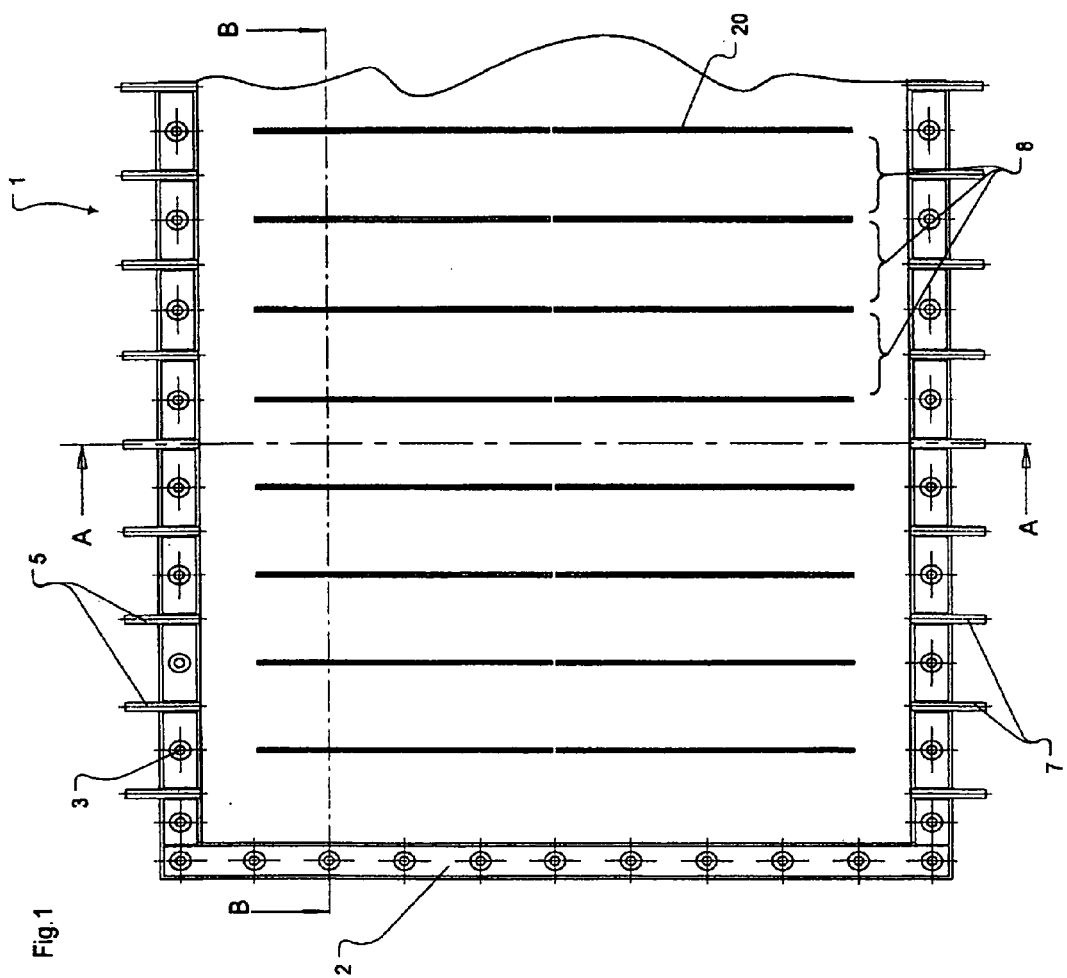
FIG. 1 shows the electrolysis cell 1 in plan view.

FIGS. 1 to 3 illustrate advantageous embodiments of the device according to the present invention. FIG. 1 shows the electrolysis cell 1 in plan view. The circumferential cell flange 2 is provided with regularly spaced bolt penetrations 3. The upper cell edge 4, which is not shown in FIG. 1, is provided with a large number of feed inlets 5. The lower cell edge 6, which is also not shown, is provided with an identical number of discharge outlets 7.

The whole electrolysis cell 1 is subdivided into sub-compartments 8, each sub-compartment 8 being provided with a feed inlet 5 and a discharge outlet 7. The sectional view according to FIG. 2 shows the feed inlet area of the electrolysis cell 1 in a vertical sectional view along line A. Cathode compartment 9 has a cathode chamber 12 between cathode 10 and ion exchange membrane 11. Inserted into the cathode back chamber 13 is a plastic packing element 14 which is cut at an angle towards feed inlet 5 so that a channel 15 of triangular section is produced below the cell edge 6. The closure of cathode back chamber 13 leads to a complete diversion of the fluid in the cells via edge gap 16 and apertures 17 in cathode 10 in the area of channel 15 into cathode space 12. The rear wall of the cell additionally shows contact strip 20 which connects neighbouring electrolysis cells 1 in a way to ensure electric conductivity.

The configuration of the anode compartment 18 and the integral components is essentially the same. Not provided are additional apertures 17 in anode 19 near edge gap 16, as the volumetric flows are smaller than on the cathode side.

FIG. 3 shows a sectional view along line B of FIG. 1. Depicted are packing elements 14 which are inserted in the back chambers of the electrodes, every packing element 14 filling in exactly one sub-compartment 8 and sub-compartments 8 being formed by webs 21 which support the electrodes and are connected to the rear wall of the respective cell compartment. In cathode chamber 12 and anode chamber 22 spacers 23 are arranged in the area of webs 21, which locally fix the ion exchange membrane 11.

KEY TO REFERENCE NUMBERS

1 Electrolysis cell
2 Cell flange
3 Bolt penetrations
4 Upper cell edge
5 Feed inlet
6 Lower cell edge
7 Discharge outlet
8 Sub-compartment
9 Cathode compartment
10 Cathode
11 Ion exchange membrane
12 Cathode chamber
13 Cathode back chamber
14 Packing elements
15 Channel
16 Edge gap
17 Apertures
18 Anode compartment
19 Anode
20 Contact strip
21 Web
22 Anode chamber
23 Spacer

The invention claimed is:

1. An electrolysis device for the purification of water, comprising a cathode, an anode and an ion exchange membrane which is arranged between the cathode and the anode together comprising an electrode and held at least continuously in the peripheral area, wherein the upper and lower peripheral areas of the electrolysis device are provided with a plurality of feed inlets and discharge outlets and further wherein a space between a rear wall of the electrolysis device and the electrode is filled with inert material to more than 90% to further comprise a packing element so that, in the specified operation mode, the water, except for slight peripheral flows, is routed into the space between the electrode and the membrane.

2. The electrolysis device for the purification of water according to claim 1, wherein, the electrolysis device comprises an assembly of individual cells essentially consisting of two compartments, the outermost rim of the compartments being provided as circumferential flange, followed by a cell rim subsequent to a circumferential edge which borders the rear wall of the cell, the electrodes being attached on the inside to the respective cell rear wall by means of webs and opposite the webs, i.e. on the electrode side facing the membrane, spacers are arranged for fixing the membrane and conducting the power, the electrode as well as the anode and cathode chambers obtained between the respective electrode and the membrane being subdivided into several parallel subcompartments.

3. The electrolysis device for the purification of water according to claim 2, wherein the feed inlets and discharge outlets are arranged behind the electrode as seen from the membrane and at least one feed inlet and one discharge outlet is assigned to each sub-compartment.

4. The electrolysis device for the purification of water according to claim 3, wherein the inert material in the area of the feed inlets and discharge outlets is shaped in such a way or is provided with an adequate aperture to allow that one or several channels are formed in parallel with the cell wall.

5. The electrolysis device for the purification of water according to claim 2, wherein the distance between the upper and the lower edge of the electrode and the rim of the cell is of a minimum width of 0.5 mm and of a maximum width of 5 mm.

6. The electrolysis device for the purification of water according to claim 1, wherein the cathode is provided with openings, apertures or the like at the upper and the lower edge opposite to the feed inlets and discharge outlets.

7. The electrolysis device for the purification of water according to claim 1, wherein the anode is constructed of expanded metal mesh and the cathode as is a plane metal sheet.

8. The electrolysis device for the purification of water according to claim 1, wherein the packing elements are bevelled along the vertical edges for dehydrating an electrode back chamber.

9. The electrolysis device for the purification of water according to claim 1, wherein the electrolysis device is constructed as a filter press and comprises a large number of individual cells lined one after the other, each of these individual cells having an anode and a cathode compartment as well as a diaphragm or ion exchange membrane arranged in between and being separated from the neighbouring cell by bipolar cell walls.

10. The electrolysis device for the purification of water according to claim 9, comprising spacers which are arranged on the electrode side facing the membrane which serve to fix the membrane and conduct the power by which the electrode and the space between the electrode and membrane are subdivided into several sub-compartments, each sub-compartment being provided with at least one feed inlet and one discharge outlet.

11. The electrolysis device for the purification of water according to claim 9, wherein sealing material which is arranged above and below the space between membrane and electrode is designed in such a way that the feed inlets and discharge outlets run through this sealing material and, in an ideal version, can be fastened to it by means of bolts.

12. The electrolysis device for the purification of water according to claim 9, wherein the perpendicular electrode distance to the ion exchange membrane ranges between 5 mm and 1.5 mm.

* * * * *

UNITED STATES PATENT AND TRADEMARK OFFICE
CERTIFICATE OF CORRECTION

PATENT NO.        : 8,444,833 B2                                           Page 1 of 1
APPLICATION NO. : 12/308444
DATED             : May 21, 2013
INVENTOR(S)       : Kiefer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1159 days.

Signed and Sealed this
Eighth Day of September, 2015

Michelle K. Lee
*Director of the United States Patent and Trademark Office*